(12) United States Patent
Sakoda et al.

(10) Patent No.: US 8,716,974 B2
(45) Date of Patent: May 6, 2014

(54) RESONANCE TYPE NON-CONTACT CHARGING APPARATUS THAT MATCHES THE INPUT IMPEDANCE OF THE RESONANCE SYSTEM WITH THE OUTPUT IMPEDANCE OF THE AC POWER SOURCE

(75) Inventors: Shimpei Sakoda, Kariya (JP); Kazuyoshi Takada, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 465 days.

(21) Appl. No.: 12/940,648

(22) Filed: Nov. 5, 2010

(65) Prior Publication Data

US 2011/0109263 A1    May 12, 2011

(30) Foreign Application Priority Data

Nov. 9, 2009  (JP) ................................ 2009-255800
May 14, 2010  (JP) ................................ 2010-112100

(51) Int. Cl.
*H02J 7/00*  (2006.01)
*H02J 7/02*  (2006.01)

(52) U.S. Cl.
CPC  *H02J 7/025* (2013.01); *H20J 5/005* (2013.01)
USPC ........................................ 320/108; 307/104

(58) Field of Classification Search
USPC ........................................ 320/108; 307/104
See application file for complete search history.

(56) References Cited

U.S. PATENT DOCUMENTS

| 5,654,621 | A * | 8/1997 | Seelig .......................... 320/108 |
| 5,754,104 | A | 5/1998 | Saito | |
| 6,321,067 | B1 | 11/2001 | Suga et al. | |
| 6,427,065 | B1 | 7/2002 | Suga et al. | |
| 7,286,881 | B2 * | 10/2007 | Schommer et al. ............. 607/61 |
| 8,338,991 | B2 * | 12/2012 | Von Novak et al. .......... 307/104 |
| 8,446,045 | B2 * | 5/2013 | Smith et al. ................... 307/104 |
| 2007/0201913 | A1 * | 8/2007 | Kamoda ....................... 399/328 |
| 2009/0015075 | A1 * | 1/2009 | Cook et al. .................... 307/149 |
| 2009/0284245 | A1 * | 11/2009 | Kirby et al. ................... 323/318 |
| 2010/0156346 | A1 * | 6/2010 | Takada et al. ................. 320/108 |
| 2010/0277003 | A1 * | 11/2010 | Von Novak et al. .......... 307/104 |

(Continued)

FOREIGN PATENT DOCUMENTS

| CN | 1156927 | 8/1997 |
| CN | 1178407 | 4/1998 |
| WO | WO 2007/008646 | 1/2007 |
| WO | WO 2010/035321 A1 | 4/2010 |

OTHER PUBLICATIONS

Soljacic et al., "Wireless Technology Developed to Transmit Power Lights Up a 60W Bulb in Tests" Nikkei Electronics, Dec. 3, 2007, 117-128.

*Primary Examiner* — Yalkew Fantu
*Assistant Examiner* — Manuel Hernandez
(74) *Attorney, Agent, or Firm* — Baker & Hostetler LLP

(57) ABSTRACT

A resonance type non-contact charging system is disclosed that includes a resonance system. The resonance system has a primary side resonance coil, a secondary side resonance coil, a reflected power detecting section, a power converting section having a DC/DC converter, and a battery. The charging system has a controlling section that controls the DC/DC converter. The controlling section controls the duty cycle of the DC/DC converter based on detection result of the reflected power detecting section such that the input impedance of the resonance system at the resonant frequency and the output impedance of a high-frequency power source match each other.

7 Claims, 4 Drawing Sheets

(56) References Cited

U.S. PATENT DOCUMENTS

| | | | |
|---|---|---|---|
| 2011/0080056 A1* | 4/2011 | Low et al. | 307/104 |
| 2011/0169337 A1* | 7/2011 | Kozakai | 307/104 |
| 2011/0231029 A1* | 9/2011 | Ichikawa et al. | 700/298 |
| 2011/0266880 A1* | 11/2011 | Kim et al. | 307/104 |
| 2012/0119588 A1* | 5/2012 | Baarman et al. | 307/104 |
| 2012/0153732 A1* | 6/2012 | Kurs et al. | 307/104 |
| 2012/0306265 A1* | 12/2012 | Yamamoto et al. | 307/9.1 |
| 2013/0113299 A1* | 5/2013 | Von Novak et al. | 307/104 |
| 2013/0234503 A1* | 9/2013 | Ichikawa | 307/9.1 |
| 2013/0270925 A1* | 10/2013 | Tanaka et al. | 307/104 |

* cited by examiner

RESONANCE TYPE NON-CONTACT CHARGING APPARATUS THAT MATCHES THE INPUT IMPEDANCE OF THE RESONANCE SYSTEM WITH THE OUTPUT IMPEDANCE OF THE AC POWER SOURCE

CROSS REFERENCE TO RELATED APPLICATIONS

This application claims priority to Japanese Application Nos. 2010-112100 and 2009-255800 filed May 14, 2010 and Nov. 9, 2009, respectively.

BACKGROUND

The present invention relates to a resonance type non-contact power transmission apparatus.

FIG. 5 schematically shows a resonance type non-contact power transmission apparatus that transmits power from a first copper wire coil 51 to a second copper wire coil 52 placed at a distance from the first copper wire coil 51 via resonance of electromagnetic fields. Such an apparatus is disclosed, for example, in NIKKEI ELECTRONICS published on Dec. 3, 2007, pages 117 to 128 and International Patent Publication No. WO/2007/008646. In FIG. 5, a magnetic field generated at a primary coil 54 connected to an AC power source 53 is intensified via magnetic field resonance of the first and second copper wire coils 51, 52. The effect of electromagnetic induction from the intensified magnetic field around the second copper wire coil 52 generates power in the secondary coil 55. The generated power is then supplied to a load 56. It has been observed that a 60-watt electric lamp, as the load 56, can be lit when first and second copper wire coils 51, 52 having a diameter of 30 cm are separated by 2 m.

To effectively supply output power of the AC power source 53 to the load 56 in this resonance type non-contact power transmission apparatus, it is necessary to efficiently supply the output power of the AC power source 53 to a resonance system (the first and second copper wire coils 51, 52 and the primary and secondary coils 54, 55). However, the above cited documents do not specifically show what should be done to obtain a resonance type non-contact power transmission apparatus that efficiently supplies output power from the AC power source 53 to a resonance system.

When the distance between the first copper wire coil 51 and the second copper wire coil 52 and the impedance of the load 56 are constant, the resonant frequency of the resonance system is obtained in advance by experimentation. An AC voltage having the obtained resonant frequency is supplied from the AC power source 53 to the primary coil 54. However, if at least one of the distance between the first copper wire coil 51 and the second copper wire coil 52 and the impedance of the load 56 changes, the input impedance of the resonance system at the resonant frequency changes. Thus, the output impedance of the AC power source 53 and the input impedance of the resonance system do not match. This increases the reflected power from the resonance system to the AC power source 53, and therefore hinders efficient supply of output power from the AC power source 53 to the load 56. In this description, the resonant frequency of the resonance system refers to the frequency at which the power transmission efficiency η is maximized.

For example, when the resonance type non-contact power transmission apparatus is used for charging a battery, the load of the battery changes according to the battery charge state. This changes the input impedance of the resonance system and thus increases the reflected power to the AC power source.

SUMMARY

Accordingly, it is an objective of the present invention to provide a resonance type non-contact power transmission apparatus that is capable of efficiently supplying power from an AC power source to a load without changing the frequency of the AC voltage of the AC power source.

To achieve the foregoing objective and in accordance with one aspect of the present invention, a resonance type non-contact power transmission apparatus is provided. The resonance type non-contact power transmission apparatus includes an AC power source, a primary side resonance coil, a secondary resonance coil, a power converting section, a load, and a controlling section. The primary side resonance coil receives power from the AC power source. The secondary resonance coil for receives power via magnetic resonance from the primary side resonance coil. The power converting section has a DC/DC converter and inputs power from the secondary side resonance coil. The load connects to the power converting section. The controlling section controls the DC/DC converter. The primary side resonance coil, the secondary side resonance coil, the power converting section, and the load form a resonance system. The controlling section controls the duty cycle of the DC/DC converter such that the input impedance of the resonance system at the resonant frequency and the output impedance of the AC power source match each other.

In the present description, "AC power source" refers to a power source that outputs an AC voltage. "The input impedance of a resonance system" refers to the impedance of the entire resonance system measured at both ends of the coil at the primary side of the resonance system. For example, when the primary side of a resonance system has a primary coil and a primary side resonance coil, "the input impedance of the resonance system" refers to the impedance of the entire resonance system measured at both ends of the primary coil. When the primary side of a resonance system only has a primary side resonance coil, "the input impedance of the resonance system" refers to the impedance of the entire resonance system measured at both ends of the primary side resonance coil.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF ILLUSTRATIVE EMBODIMENTS

A resonance type non-contact power transmission apparatus according to a first embodiment of the present invention will now be described with reference to FIG. 1. The resonance type non-contact power transmission apparatus of the present embodiment is used in a resonance type non-contact charging system that charges a battery 24 mounted on a vehicle without contact.

Figure 1:
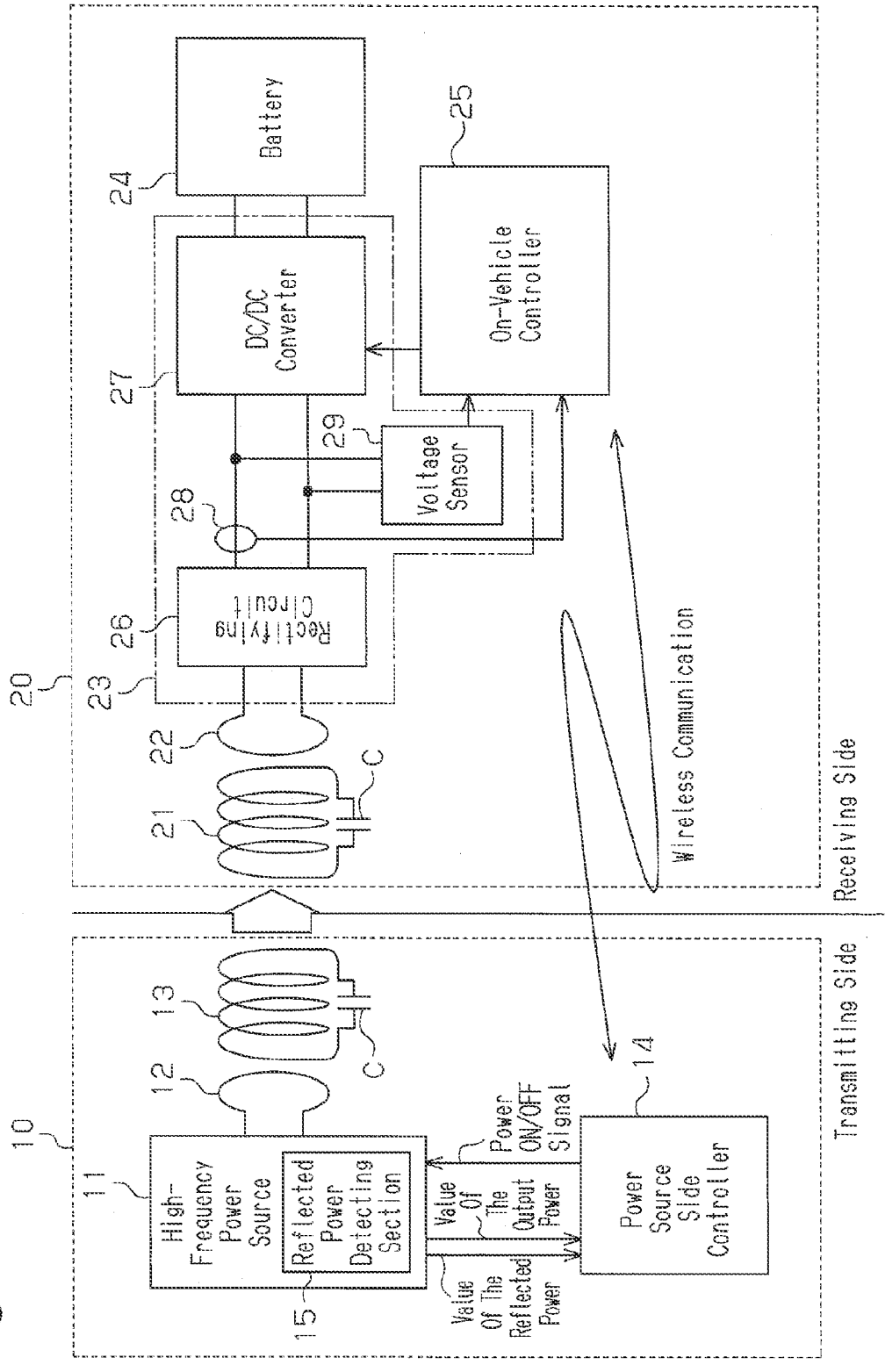
FIG. 1 is a diagram illustrating a resonance type non-contact power transmission apparatus according to a first embodiment of the present invention.

As shown in FIG. 1, the resonance type non-contact charging system includes transmission side equipment 10 and on-vehicle equipment 20. The transmission side equipment 10 includes a high-frequency power source 11 serving as an AC power source, a primary coil 12 connected to the high-frequency power source 11, a primary side resonance coil 13, and a power source side controller 14. The on-vehicle equipment 20 includes a secondary side resonance coil 21, a secondary coil 22, a power converting section 23 connected to the secondary coil 22, a battery 24 as a load connected to the power converting section 23, and an on-vehicle controller 25 serving as a controlling section. A capacitor C is connected to each of the primary side resonance coil 13 and the secondary side resonance coil 21. The primary coil 12, the primary side resonance coil 13, the secondary side resonance coil 21, the secondary coil 22, the power converting section 23, the battery 24, and the two capacitors C form a resonance system. The power source side controller 14 and the on-vehicle controller 25 are configured to wirelessly communicate with each other.

The high-frequency power source 11 receives a power ON/OFF signal from the power source side controller 14 so as to be turned on or off. The high-frequency power source 11 outputs an AC power the frequency of which is equal to a predetermined resonant frequency of the resonance system, for example, a high-frequency power of several MHz. The high-frequency power source 11 includes a reflected power detecting section 15 for detecting the reflected power from the primary side resonance coil 13 and an output power measuring section (not shown) for measuring the power outputted to the primary side resonance coil 13. The power source 11 sends the values of the reflected power and the output power to the power source side controller 14.

The power converting section 23 includes a rectifying circuit 26 that converts AC current from the secondary coil 22 into DC current, and a DC/DC converter 27 that converts the DC voltage from the rectifying circuit 26 into a voltage suitable for charging the battery 24. The power converting section 23 includes a current sensor 28 that detects the current sent from the rectifying circuit 26 to the DC/DC converter 27, and a voltage sensor 29 that detects the voltage sent from the rectifying circuit 26 to the DC/DC converter 27. The DC/DC converter 27 is controlled by the on-vehicle controller 25.

The on-vehicle controller 25 receives detection signals from the current sensor 28 and the voltage sensor 29. Based on these signals, the on-vehicle controller 25 detects the ratio of the voltage value and the current value inputted to the DC/DC converter 27, in other words, the impedance. The current sensor 28, the voltage sensor 29, and the on-vehicle controller 25 form an impedance detecting section.

The on-vehicle controller 25 controls the duty cycle of the DC/DC converter 27 such that the input impedance of the resonance system at the resonant frequency and the output impedance of the high-frequency power source 11 match with each other. Specifically, the on-vehicle controller 25 receives from the power source side controller 14 the value of the reflected power from the primary side resonance coil 13 in the high-frequency power source 11, and controls the duty cycle of the DC/DC converter 27 such that the reflected power becomes lower than or equal to a predetermined threshold value. For example, a value of reflected power above which charging cannot be efficiently performed is obtained in advance, for example, by experimentation. The threshold value is set to a value less than the obtained value.

Operation of the resonance type non-contact charging system configured as described above will now be described.

The battery 24 is charged with the vehicle stopped at a predetermined charging position, where the distance between the primary side resonance coil 13 and the secondary side resonance 21 is constant. After the vehicle is stopped at the charging position, the on-vehicle controller 25 sends a charging request signal to the power source side controller 14. When receiving the charging request signal from the on-vehicle controller 25, the power source side controller 14 controls the high-frequency power source 11 to output AC power of a frequency equal to the resonant frequency of the resonance system, for example, a high-frequency power of several MHz.

Then, the high-frequency power source 11 outputs an AC voltage of the resonant frequency of the resonance system to the primary coil 12, so that a magnetic field is generated at the primary coil 12. The magnetic field generated at the primary coil 12 is intensified by magnetic field resonance of the primary side resonance coil 13 and the secondary side resonance coil 21, and the electromagnetic induction of the intensified magnetic field of the secondary side resonance coil 21 generates AC power at the secondary coil 22. The generated AC power is supplied to the power converting section 23. The AC power input to the power converting section 23 is converted into DC power by the rectifying circuit 26 having a voltage suitable for charging the battery 24 by the DC/DC converter 27. The power is then supplied to the battery 24, so that the battery 24 is charged.

The input impedance of the resonance system varies according to the charge state of the battery 24. Thus, when the high-frequency power source 11 outputs AC power at a constant frequency, the reflected power is increased depending on the charge state of the battery 24 even if the charging is started with the minimum reflected power. The power source side controller 14 monitors the reflected power via the reflected power detecting section 15 of the high-frequency power source 11. The on-vehicle controller 25 receives the reflected power from the power source side controller 14 and controls the duty cycle of the DC/DC converter 27 such that the reflected power becomes less than or equal to the predetermined threshold value. For example, when the ON period of the DC/DC converter 27 is reduced, the output voltage of the DC/DC converter 27 is raised and the output current is reduced. This increases the input impedance of the resonance system. Also, when the ON period of the DC/DC converter 27 is increased, the output voltage of the DC/DC converter 27 is lowered and the output current is increased. This decreases the input impedance of the resonance system. As a result, even when the state of charge of the battery 24 is changed, matching between the input impedance of the resonance system and the output impedance of the high-frequency power source 11 is maintained.

The present embodiment has the following advantages.

(1) The resonance type non-contact power transmission apparatus according to the present embodiment includes the AC power source (the high-frequency power source 11), the primary coil 12 connected to the AC power source, the primary side resonance coil 13, the secondary side resonance coil 21, the secondary coil 22, and the power converting section 23 connected to the secondary coil 22. The secondary side resonance coil 21 operates with the primary side resonance coil 13 to intensify the magnetic field generated at the primary coil 12. The power converting section 23 includes the DC/DC converter 27. The resonance type non-contact power transmission apparatus of the present invention also includes the load (the battery 24) connected to the power converting section 23, and the controlling section (the on-vehicle controller 25) that controls the DC/DC converter 27. The primary coil 12, the primary side resonance coil 13, the secondary side resonance coil 21, the secondary coil 22, the power converting section 23, and the load (the battery 24) form the resonance system. The controlling section (the on-vehicle controller 25) controls the duty cycle of the DC/DC converter 27 such that the input impedance of the resonance system at the resonant frequency and the output impedance of the AC power source (the high-frequency power source 11) match with each other. Therefore, the power from the AC power source (the high-frequency power source 11) can be efficiently supplied to the load without changing the frequency of the AC voltage of the AC power source (the high-frequency power source 11).

(2) The resonance type non-contact power transmission apparatus of the present embodiment includes the impedance detecting section (the current sensor 28 and the voltage sensor 29) that detects the ratio of the current and voltage inputted to the DC/DC converter 27. The controlling section (the on-vehicle controller 25) controls the duty cycle of the DC/DC converter 27 based on the detection result of the impedance detecting section. Therefore, the duty cycle of the DC/DC converter 27 is controlled based on changes in the ratio of the current and voltage inputted to the DC/DC converter 27, which ratio directly influences changes in the reflected power from the primary side resonance coil 13 to the AC power source (the high-frequency power source 11). That is, the duty cycle is controlled based on changes in the impedance. Thus, the input impedance of the resonance system and the output impedance of the AC power source (the high-frequency power source 11) can be matched with each other properly.

(3) The AC power source (the high-frequency power source 11) includes the reflected power detecting section 15 that detects the reflected power from the primary side resonance coil 13 to the AC power source (the high-frequency power source 11). The controlling section (the on-vehicle controller 25) controls the duty cycle of the DC/DC converter 27 such that the reflected power becomes lower than or equal to the predetermined threshold value. Therefore, the reflected power is actually detected and controlled to be less than or equal to the threshold value. This reliably allows the AC power source (the high-frequency power source 11) to efficiently supply power to the load (the battery 24).

(4) The resonance type non-contact power transmission apparatus of the present embodiment is used in a system that charges the battery 24 mounted on the vehicle without contact. Even when the state of charge of the battery 24 changes during charging, the reflected power from the primary side resonance coil 13 to the AC power source (the high-frequency power source 11) is suppressed without providing any special circuit such as an impedance matching circuit. Thus, the battery 24 can be efficiently charged. Apparatuses for charging batteries generally have a voltage converting section (power converting section) for converting the voltage supplied from a power source into a voltage suitable for charging the battery. Such a power converting section can be used for the present embodiment.

(5) A capacitor C is connected to each of the primary side resonance coil 13 and the secondary side resonance coil 21. This allows the resonant frequency of the resonance system to be lowered without increasing the numbers of turns of the primary side resonance coil 13 or of the secondary side resonance coil 21. If the resonant frequency is the same, the primary side resonance coil 13 and the secondary side resonance coil 21 can be reduced in size compared to a case where no capacitors C are connected.

Figure 2:
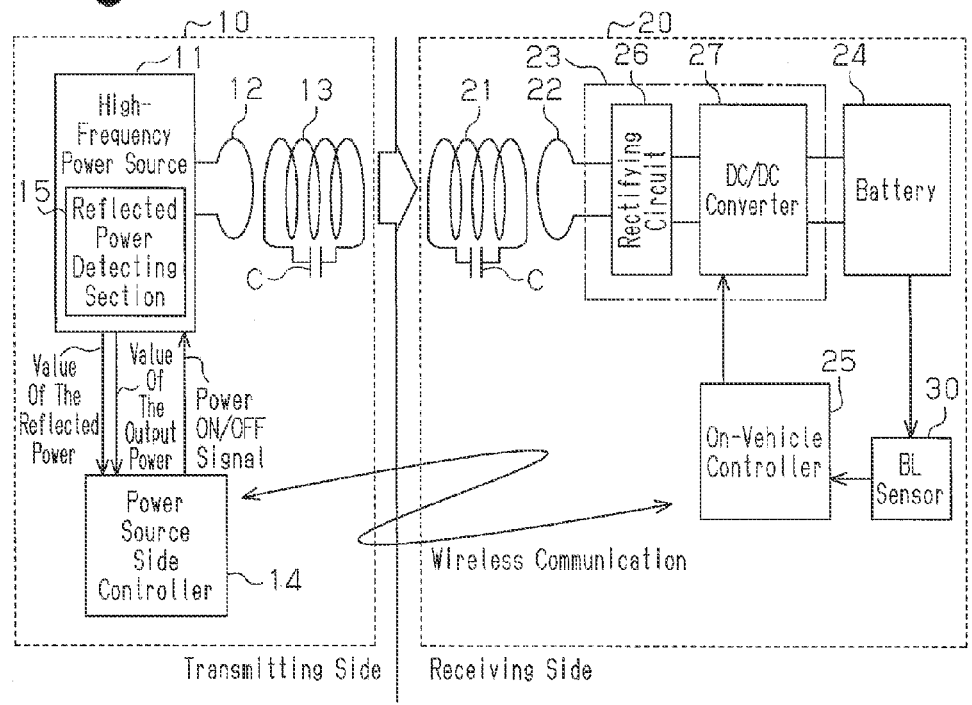
FIG. 2 is a diagram illustrating a resonance type non-contact power transmission apparatus according to a second embodiment of the present invention.

A second embodiment of the present invention will now be described with reference to FIG. 2. A resonance type non-contact power transmission apparatus (resonance type non-contact charging system) of the present embodiment includes a state-of-load detecting section that detects the state of the load (the battery 24). The on-vehicle controller 25 controls the duty cycle of the DC/DC converter 27 based on the detection result of the state-of-load detecting section. Other than these differences, the present embodiment is the same as the first embodiment, and like or the same reference numerals are given to those components that are like or the same as the corresponding components of the first embodiment and detailed explanations are omitted.

On-vehicle equipment 20 of the present embodiment does not have the current sensor 28 or the voltage sensor 29, but includes a battery level sensor 30 serving as a state-of-load detecting section. The battery level sensor 30 detects the amount of charge of the battery 24 and sends the detection signal to the on-vehicle controller 25.

The on-vehicle controller 25 of the present embodiment stores, as a map or a relational expression, data representing the relationship of the amount of charge of the battery and the reflected power with an appropriate duty cycle of the DC/DC converter 27. The data is obtained by experiments in advance. The on-vehicle controller 25 computes an appropriate duty cycle of the DC/DC converter 27 based on a detection signal of the battery level sensor 30 and the value of the reflected power sent from the power source side controller 14, and controls the DC/DC converter 27 using the computed duty cycle. As a result, the duty cycle of the DC/DC converter 27 is controlled such that the input impedance of the resonance system at the resonant frequency and the output impedance of the high-frequency power source 11 match with each other.

Accordingly, the present embodiment has the following advantages in addition to the advantages of the first embodiment (1), (3) to (5).

(6) The resonance type non-contact power transmission apparatus of the present embodiment includes the state-of-load detecting section (the battery level sensor 30) that detects the state of the load (the battery 24). The on-vehicle controller 25 controls the duty cycle of the DC/DC converter 27 based on the detection result of the state-of-load detecting section (the battery level sensor 30). There is a consistent relationship between the state of the load (the battery 24) and the input impedance of the resonance system, and such relationship is examined in advance. Also, the duty cycle of the DC/DC converter 27 is controlled such that the input impedance of the resonance system becomes an impedance suitable for the state of the load. Thus, the input impedance of the resonance system and the output impedance of the high-frequency power source 11 can be matched with each other properly.

(7) The resonance type non-contact power transmission apparatus of the present embodiment does not require the current sensor 28 or the voltage sensor 29. This simplifies the structure compared to the resonance type non-contact power transmission apparatus of the first embodiment.

A third embodiment of the present invention will now be described with reference to FIG. 3. A resonance type non-contact power transmission apparatus (resonance type non-contact charging system) of the present embodiment is different from the first embodiment in that the transmission side equipment 10 does not have the primary coil 12 and that the on-vehicle equipment 20 does not have the secondary coil 22. Other than these differences, the present embodiment is the same as the first embodiment, and like or the same reference numerals are given to those components that are like or the same as the corresponding components of the first embodiment and detailed explanations are omitted.

The primary side resonance coil 13 is connected to the high-frequency power source 11. That is, the primary side resonance coil 13 directly receives power from the high-frequency power source 11, not via the primary coil 12. The secondary side resonance coil 21 is connected to the rectifying circuit 26. That is, the power converting section 23 directly receives power that has been received by the secondary side resonance coil 21, from the secondary side resonance coil 21 not via the secondary coil 22. In the present embodiment, the primary side resonance coil 13, the secondary side resonance coil 21, the power converting section 23, and the battery 24 form a resonance system.

The high-frequency power source 11 outputs an AC power the frequency of which is equal to a predetermined resonant frequency of the resonance system, for example, a high-frequency power of several MHz. In the present embodiment, the resonance system does not have the primary coil 12 or secondary coil 22, and the resonant frequency is different from that of the first embodiment. The on-vehicle controller 25 controls the duty cycle of the DC/DC converter 27 such that the input impedance of the resonance system at the resonant frequency and the output impedance of the high-frequency power source 11 match with each other.

The high-frequency power source 11 of the present embodiment outputs AC power having the resonant frequency of the resonance system to the primary side resonance coil 13. The AC power sent to the primary side resonance coil 13 is transmitted to the secondary side resonance coil 21 via magnetic field resonance by the primary side resonance coil 13 and the secondary side resonance coil 21. The secondary side resonance coil 21 receives the AC power, which is supplied to the power converting section 23. The AC power inputted to the power converting section 23 is converted into DC power by the rectifying circuit 26, and the voltage of the power is converted to a voltage suitable for charging the battery 24 by the DC/DC converter 27. The power is then supplied to the battery 24, so that the battery 24 is charged.

Accordingly, the present embodiment has the following advantages in addition to the advantages of the first embodiment (2) to (5).

(8) The resonance type non-contact power transmission apparatus according to the present embodiment includes the AC power source (the high-frequency power source 11), the primary side resonance coil 13 connected to the AC power source, the secondary side resonance coil 21, and the power converting section 23 connected to the secondary side resonance coil 21. The secondary side resonance coil 21 receives AC power outputted from the high-frequency power source 11 to the primary side resonance coil 13 via magnetic field resonance by the primary side resonance coil 13 and the secondary side resonance coil 21. The power converting section 23 includes the DC/DC converter 27. The resonance type non-contact power transmission apparatus of the present invention also includes the load (the battery 24) connected to the power converting section 23, and the controlling section (the on-vehicle controller 25) that controls the DC/DC converter 27. The primary side resonance coil 13, the secondary side resonance coil 21, the power converting section 23, and the load (the battery 24) form a resonance system. The controlling section (the on-vehicle controller 25) controls the duty cycle of the DC/DC converter 27 such that the input impedance of the resonance system at the resonant frequency and the output impedance of the AC power source (the high-frequency power source 11) match with each other. Therefore, the power from the AC power source (the high-frequency power source 11) can be efficiently supplied to the load (the battery 24) without changing the frequency of the AC voltage of the AC power source (the high-frequency power source 11).

(9) The resonance type non-contact power transmission apparatus of the present embodiment does not require the primary coil 12 or the secondary coil 22. This simplifies the structure compared to the resonance type non-contact power transmission apparatus of the first embodiment.

The present invention is not limited to the above embodiments, but may be modified as follows.

In the resonance type non-contact power transmission apparatus (resonance type non-contact charging system) according to third embodiment, which does not have the primary coil 12 or the secondary coil 22, a matching box 31 may be connected between the secondary side resonance coil 21 and the rectifying circuit 26. The matching box 31 includes, for example, a variable capacitor and an inductor. The impedance of the matching box 31 is adjusted by adjusting the capacitance of the variable capacitor. In this case, the primary side resonance coil 13, the secondary side resonance coil 21, the matching box 31, the power converting section 23, and the battery 24 form a resonance system. In a resonance type non-contact power transmission apparatus (resonance type non-contact charging system) that does not have the primary coil 12 or the secondary coil 22, the resonance system is harder to put into a resonance state than a structure having the primary coil 12 and the secondary coil 22. However, if the matching box 31 is connected to the secondary side resonance coil 21 and the rectifying circuit 26, the resonance system can be easily put into a resonance state by adjusting the matching box 31. Also, if the matching box 31 is provided, the size of the capacitors C can be reduced compared to a case where the matching box 31 is not provided.

Figure 3:
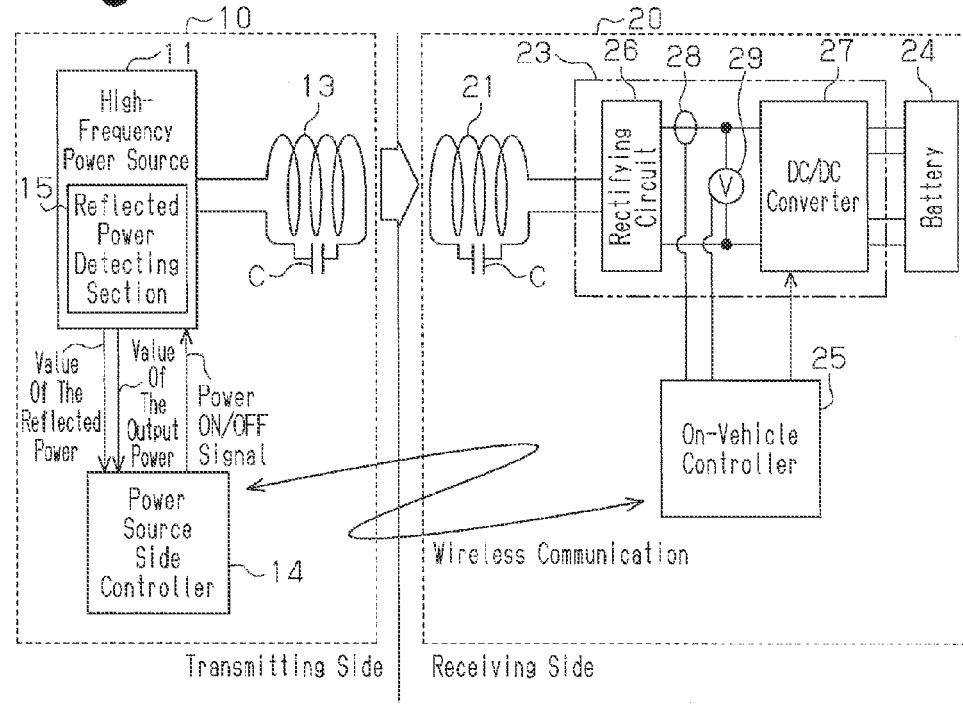
FIG. 3 is a diagram illustrating a resonance type non-contact power transmission apparatus according to a third embodiment of the present invention.
Figure 4:
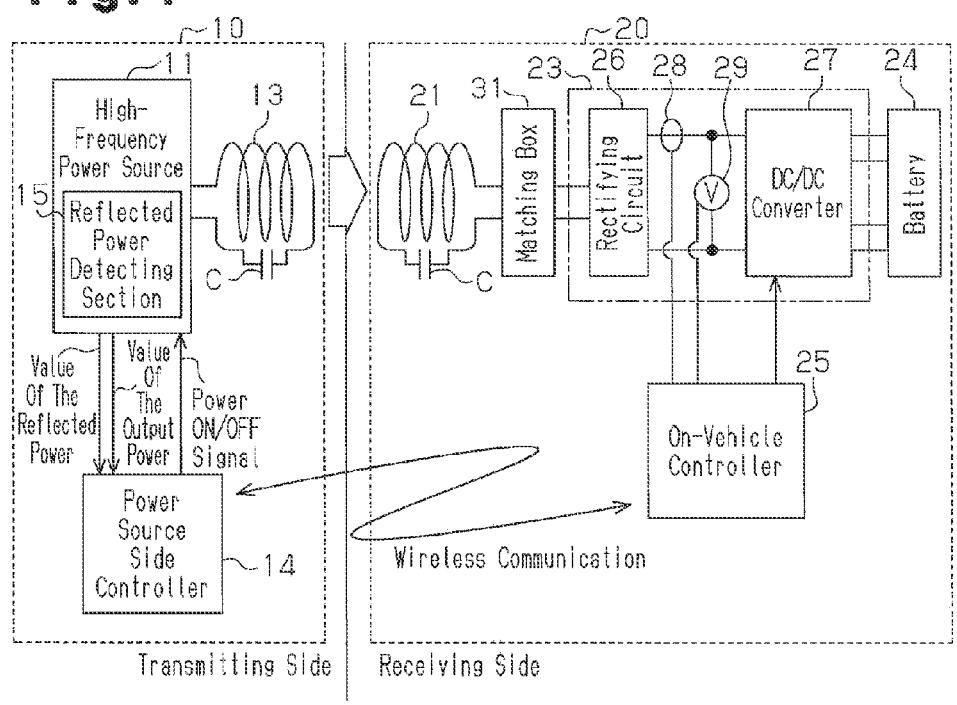
FIG. 4 is a schematic diagram of a resonance type non-contact power transmission apparatus according to a modified embodiment of the present invention.
Figure 5:
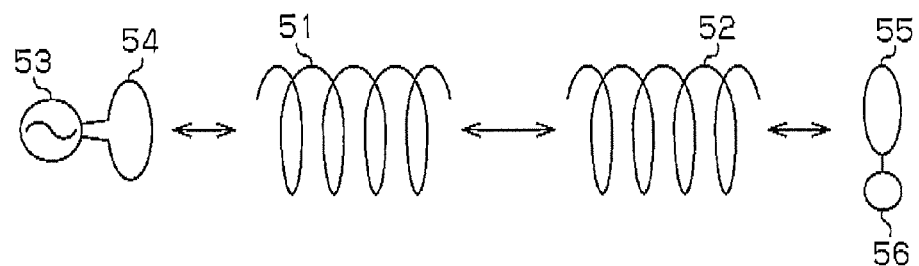
FIG. 5 is a diagram showing the configuration of a prior art non-contact power transmission apparatus.

In the resonance type non-contact power transmission apparatus according to the second embodiment, which includes the state-of-load detecting section for detecting the state of the load (the battery 24) and controls the duty cycle of the DC/DC converter 27 based on the detection result of the state-of-load detecting section, the primary coil 12 and the secondary coil 22 may be omitted as shown in FIGS. 3 and 4.

In the second embodiment, the objective of detection of the reflected power using the reflected power detecting section 15 is to monitor that the duty cycle of the DC/DC converter 27 is properly controlled, that is, to monitor that the reflected power is not increased. Therefore, the reflected power detecting section 15 may be omitted.

In place of the battery level sensor 30, a detecting section may be provided as a state-of-load detecting section to detect the internal resistance of the battery 24.

When the state-of-load detecting section detects the state of load of the battery 24, the relationship of the state of load with either the current or voltage input to the DC/DC converter 27 is obtained by experimentation in advance. Data based on the relationship is stored in the memory of the on-vehicle controller 25. One of the current and voltage inputted to the DC/DC converter 27 is detected. The duty cycle of the DC/DC converter 27 may be controlled by estimating the reflected power based on the detection result and the state of load of the battery 24.

In the first embodiment, the third embodiment, or the embodiment shown in FIG. 4, the reflected power detecting section 15 may be omitted, and the duty cycle of the DC/DC converter 27 may be controlled based only on the detection result of the current sensor 28 and the voltage sensor 29, which form the impedance detecting section. For example, at normal charging of the battery 24, the charge state of the battery 24 changes over time. Accordingly, the impedances are displaced from each other, and the reflected power changes. Such changes in the reflected power are obtained by experiments in advance and stored in the memory of the on-vehicle controller 25. The on-vehicle controller 25 computes the power inputted to the DC/DC converter 27 based on detection signals of the current sensor 28 and the voltage sensor 29, and estimates changes in the reflected power based on the changes in the power and the time elapsed since the start of charging. The on-vehicle controller 25 controls the duty cycle of the DC/DC converter 27 such that the reflected power does not surpass the threshold value. When the reflected power is increased, the power inputted to the DC/DC converter 27 is reduced. Thus, if the reflected power is estimated based on changes in the power inputted to the DC/DC converter 27, error of estimate will not be so excessive that control is disturbed.

In each of the above illustrated embodiments, the resonance type non-contact power transmission apparatus is not limited to a system that charges the battery 24 mounted on a vehicle without contact. For example, the present invention may be applied to any system that charges, without contact, the battery of a moving body such as a ship and a self-propelled robot or the battery in a portable electronic device such as a mobile phone and a portable computer.

In each of the above embodiments, the use of the resonance type non-contact power transmission apparatus is not limited to resonance type non-contact charging systems. Instead, the resonance type non-contact power transmission apparatus may be applied to a case where an electrical device the load of which changes stepwise is used as a load, or a case where power is selectively supplied to one of a plurality of electrical devices having different values of load.

In each of the above embodiments, the capacitors C connected to the primary side resonance coil 13 and the secondary side resonance coil 21 may be omitted. However, a configuration with capacitors C lowers the resonant frequency compared to a configuration without capacitors C. If the resonant frequency is the same, the primary side resonance coil 13 and the secondary side resonance coil 21 can be reduced in size compared to a case where the capacitors C are omitted.

In each of the above embodiments, the power converting section 23 is a single module having the rectifying circuit 26 and the DC/DC converter 27. Instead, the power converting section 23 may be formed by a rectifier and the DC/DC converter 27.

In each of the above embodiments, the high-frequency power source 11 may be configured such that the frequency of the AC voltage is either variable or invariable.

In each of the above embodiments, the shapes of the primary coil 12, the primary side resonance coil 13, the secondary side resonance coil 21, and the secondary coil 22 do not need to be circular in a plan view. For example, the shapes may be polygonal shape such as a rectangle, hexagon, and triangle. The shapes may also be elliptic. Also, the outer shapes of the primary coil 12, the primary side resonance coil 13, the secondary side resonance coil 21, and the secondary coil 22 do not need to be bilaterally symmetrical, but may be asymmetrical.

The primary side resonance coil 13 and the secondary side resonance coil 21 are not limited to coils formed by winding an electric wire into a cylindrical shape, but may be formed by winding an electric wire into a spiral in a single plane.

Instead of forming the primary coil 12, the primary side resonance coil 13, the secondary side resonance coil 21, and the secondary coil 22 with wires, these coils may be formed by wiring patterns on substrates.

What is claimed:

1. A resonance type non-contact power transmission apparatus comprising:
   primary side equipment including:
   an AC power source;
   a primary side resonance coil for receiving power from the AC power source; and
   a reflected power detecting section for detecting a reflected power from the primary side resonance coil to the AC power source; and
   secondary side equipment including:
   a secondary side resonance coil for receiving power via magnetic resonance from the primary side resonance coil;
   a power converting section that has a DC/DC converter and inputs power from the secondary side resonance coil;
   a load connected to the power converting section; and
   a controlling section for controlling the DC/DC converter,
   wherein the controlling section controls a duty cycle of the DC/DC converter based on a detection result of the reflected power detecting section to decrease the reflected power from the primary side resonance coil to the AC power source.

2. The apparatus according to claim 1, further comprising a primary coil connected to the AC power source and a secondary coil connected to the power converting section,
   wherein the primary side resonance coil receives power from the AC power source through the primary coil,
   wherein the secondary coil receives power from the secondary side resonance coil, and
   wherein the power converting section receives the power received by the secondary side resonance coil through the secondary coil.

3. The apparatus according to claim 1, further comprising an impedance detecting section for detecting a ratio of a current and a voltage input into the DC/DC converter,
   wherein the controlling section controls the duty cycle of the DC/DC converter based on a detection result of the impedance detecting section.

4. The apparatus according to claim 1, further comprising a state-of-load detecting section for detecting the state of the load,
   wherein the controlling section controls the duty cycle of the DC/DC converter based on a detection result of the state-of-load detecting section.

5. The apparatus according to claim 1,
   wherein the controlling section controls the duty cycle of the DC/DC converter such that the reflected power becomes less than or equal to a predetermined threshold value.

6. The apparatus according to claim 1, wherein the primary side resonance coil is connected to the AC power source, and the secondary side resonance coil is connected to the power converting section.

7. The apparatus according to claim 1, wherein the load is a battery mounted on a moving body,
wherein the apparatus is used in a resonance type non-contact charging system for charging the battery, and
wherein the secondary side resonance coil, the power converting section, the battery, and the controlling section are mounted on the moving body.

\* \* \* \* \*